United States Patent [19]
Burmaster et al.

[11] Patent Number: 5,851,265
[45] Date of Patent: Dec. 22, 1998

[54] SELECTIVE REMOVAL AND RECOVERY OF SULFUR DIOXIDE FROM EFFLUENT GASES USING ORGANIC PHOSPHOROUS SOLVENTS

[75] Inventors: Brian M. Burmaster, Chesterfield; Donald R. McAlister, Ballwin, both of Mo.

[73] Assignee: Monsanto Company, St. Louis, Mo.

[21] Appl. No.: 707,344

[22] Filed: Sep. 3, 1996

[51] Int. Cl.⁶ .......................... B01D 47/06; B01D 47/14
[52] U.S. Cl. ................ 95/159; 95/187; 95/191; 95/206; 95/211; 95/235
[58] Field of Search ............... 95/159, 211, 181, 95/187, 191, 235, 206; 55/220, 228, 233; 96/234, 243, 290

[56] References Cited

U.S. PATENT DOCUMENTS

| | | | |
|---|---|---|---|
| 2,128,108 | 8/1938 | Tyrer et al. | 23/175 |
| 2,862,789 | 12/1958 | Burgess | 23/119 |
| 2,881,047 | 4/1959 | Townsend | 23/3 |
| 3,441,379 | 4/1969 | Renault | 23/226 |

(List continued on next page.)

FOREIGN PATENT DOCUMENTS

| | | | |
|---|---|---|---|
| 77492 | 4/1983 | European Pat. Off. | 95/235 |
| 0 216 388 | 4/1987 | European Pat. Off. | |
| 709140 | 1/1980 | U.S.S.R. | 95/181 |
| 1057083 | 11/1983 | U.S.S.R. | 95/235 |
| 1292814 | 2/1987 | U.S.S.R. | 95/235 |
| WO 81/03654 | 12/1981 | WIPO . | |
| 87/01612 | 3/1987 | WIPO | 95/181 |
| WO 96/04202 | 2/1996 | WIPO . | |
| WO 96/11164 | 4/1996 | WIPO . | |

OTHER PUBLICATIONS

Demyanovich et al., "Prediction of Infinite Dilution Coefficients of Sulfur Dioxide in Organic Solvents," *Journal of Solutions Chemistry*, vol. 20, No. 7, pp. 693–701, 1991.

International Search Report in connection with International Application No. PCT/US 97/14283.

(List continued on next page.)

*Primary Examiner*—Duane S. Smith
*Attorney, Agent, or Firm*—Senniger, Powers, Leavitt & Roedel

[57] ABSTRACT

A process for the selective removal and recovery of sulfur dioxide from effluent gases is disclosed. The sulfur dioxide is recovered in a sulfur dioxide absorption/desorption cycle which utilizes a liquid solvent to selectively absorb sulfur dioxide from the effluent gas. The liquid solvent includes an organic phosphorous compound selected from phosphate triesters, phosphonate diesters, phosphinate monoesters and mixtures thereof. Preferably, the liquid solvent includes phosphonate diesters of the formula

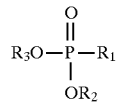

wherein $R^1$, $R^2$ and $R^3$ are independently aryl or $C_1$ to $C_8$ alkyl. The organic phosphonate diesters are substantially water immiscible, the solubility of water in the organic phosphonate diester being less than about 10 weight percent at 25° C., and have a vapor pressure less than about 1 Pa at 50° C. In accordance with a preferred embodiment, the liquid solvent include dibutyl butyl phosphonate. The absorbed sulfur dioxide is subsequently stripped to regenerate the organic phosphorous solvent and produce a gas enriched in sulfur dioxide content. The sulfur dioxide-enriched gas may be used as part of the feed gas to a contact sulfuric acid plant or a Claus plant for the preparation of elemental sulfur or be cooled to condense sulfur dioxide in the form of a liquid product. The present invention is particularly useful in producing a sulfur dioxide-enriched gas from gases relatively weak in sulfur dioxide content.

30 Claims, 3 Drawing Sheets

U.S. PATENT DOCUMENTS

| | | | |
|---|---|---|---|
| 3,590,555 | 7/1971 | Wackernagel | 95/181 |
| 3,671,194 | 6/1972 | Roberts | 23/176 |
| 3,767,777 | 10/1973 | Frye et al. | 95/181 |
| 3,793,440 | 2/1974 | Schulze | 423/573 |
| 3,829,560 | 8/1974 | Fornoff et al. | 423/522 |
| 3,904,735 | 9/1975 | Atwood et al. | 423/243 |
| 4,107,269 | 8/1978 | Rossarie et al. | 423/222 |
| 4,133,650 | 1/1979 | Germerdonk et al. | 95/235 |
| 4,144,039 | 3/1979 | Blanc et al. | 95/235 |
| 4,170,628 | 10/1979 | Kosseim et al. | 423/243 |
| 4,181,506 | 1/1980 | Bengtsson | 95/235 |
| 4,201,752 | 5/1980 | Kosseim et al. | 423/235 |
| 4,330,522 | 5/1982 | Lieder | 95/235 |
| 4,342,733 | 8/1982 | Steelhammer et al. | 423/242 |
| 4,409,192 | 10/1983 | Lichtner et al. | 423/242 |
| 4,450,145 | 5/1984 | Klepeis | 95/235 |
| 4,479,929 | 10/1984 | Lacy, Jr. | 423/575 |
| 4,530,704 | 7/1985 | Jones et al. | 95/181 |
| 4,530,827 | 7/1985 | Heisel et al. | 95/235 |
| 4,749,555 | 6/1988 | Bush | 95/235 |
| 4,818,506 | 4/1989 | Lin e al. | 423/242 |
| 4,834,955 | 5/1989 | Mouche et al. | 423/242 |
| 4,885,146 | 12/1989 | Lassmann et al. | 423/235 |
| 5,019,361 | 5/1991 | Hakka | 423/243 |
| 5,108,723 | 4/1992 | Chang et al. | 423/242 |
| 5,246,677 | 9/1993 | Moser et al. | 423/243.08 |
| 5,246,679 | 9/1993 | Moser et al. | 423/243.09 |
| 5,304,361 | 4/1994 | Parisi | 423/220 |
| 5,628,977 | 5/1997 | Heisel et al. | 423/573.1 |

OTHER PUBLICATIONS

George T. Austin, "Shreve's Chemical Process Industries" Fifth Edition, pp. 92–94 (1984).

Fleming, et al., "Liquid Sulfur Dioxide From Waste Smelter Gases" Industrial and Engineering Chemistry, vol. 42, No.11, pp. 2253–2258 (Nov. 1950).

Franckowiak, et al., "Estasolvan: New Gas Treating Process" Hydrocarbon Processing, vol. 49, pp. 145–148 (May 1970).

Heisel, et al., "Clinsulf and Clintox® New Processes to Economically and Effectively Recover Sulphur from Claus Feed Gas" Presentation at the 1st Quarterly Meeting of the Canadian Gas Processors Assoc., Calgary (Mar. 1987).

Kohl, et al., "Gas Purification" pp. 199–204 (1960).

R.N. Maddox, "Gas and Liquid Sweetening" Second Edition, Chapter 5—Physical Absorption Methods, pp. 128–155 (1977).

C. Donald Swaim, Jr., "Sulfur Removal and Recovery from Industrial Processes" American Chemical Society, Advances in Chemistry Series, No. 139, Capter 9—The Shell Claus Offgas Treating (SCOT) Process, pp. 111–119 (1975).

Max Schmidt, "Fundamental Chemistry of Sulfur Dioxide Removal and Subsequent Recovery Via Aqueous Scrubbing" Intl. J. Sulfur Chem., Part B, vol. 7, No. 1, pp. 11–19 (1972).

C.W. Sweeney, "Solubilities and Partial Molar Enthalpies of Solution for Polar Gas–Liquid Systems Determined by Gas Chromatography" Chromatographia, vol. 18, No. 12, pp. 663–667 (1984).

Yon, et al., "Use UCAP for Sulfur Recovery" Hydrocarbon Processing, pp. 197–200 (Jul. 1979).

SELECTIVE REMOVAL AND RECOVERY OF SULFUR DIOXIDE FROM EFFLUENT GASES USING ORGANIC PHOSPHOROUS SOLVENTS

BACKGROUND OF THE INVENTION

This invention relates to the selective removal and recovery of sulfur dioxide from effluent gases. More particularly, the present invention relates to recovering sulfur dioxide from effluent gases in a sulfur dioxide absorption/desorption process which utilizes a liquid solvent comprising certain organic phosphorous compounds to selectively absorb sulfur dioxide from the effluent gas. The absorbed sulfur dioxide is subsequently stripped to regenerate the solvent and produce a gas enriched in sulfur dioxide content. The sulfur dioxide-enriched gas may be used as part of the feed gas to a contact sulfuric acid plant or a Claus plant for the preparation of elemental sulfur or be cooled to condense sulfur dioxide in the form of a liquid product. The present invention is particularly useful in producing a sulfur dioxide-enriched gas from effluent gases relatively weak in sulfur dioxide content.

Gaseous effluents containing sulfur dioxide are produced by a variety of operations, including roasting or smelting of sulfidic metal ores and concentrates and the combustion of sulfur-containing fuels (e.g., flue gases).

The sulfur dioxide in these effluent gases may be combined with oxygen and fed to a contact sulfuric acid plant and recovered as sulfuric acid and/or oleum. However, these gas streams frequently have relatively low sulfur dioxide concentration and a high concentration of water vapor. Where sulfur dioxide concentration in the gas fed to a sulfuric acid plant is less than about 4 to 5 percent by volume, problems may arise with respect to both the water balance and the energy balance in the acid plant. More particularly, the material balance of a conventional sulfuric acid plant requires that the $H_2O/SO_2$ molar ratio in the sulfur dioxide-containing gas stream fed to the plant be no higher than the $H_2O/SO_3$ molar ratio in the product acid. If the desired product acid concentration is 98.5 percent or above, this ratio cannot be more than about 1.08 in the sulfur dioxide-containing gas stream fed to the plant. As generated, effluent gases from metallurgical processes and flue gases from the combustion of sulfurous fuels often have a water vapor content well above the 1.1 ratio which cannot be sufficiently reduced by cooling the gas without significant capital and energy expenditures. Moreover, if the sulfur dioxide gas strength of the source gas is below about 4 to 5 percent by volume, it may not be sufficient for autothermal operation of the catalytic converter. That is, the heat of conversion of sulfur dioxide to sulfur trioxide may not be great enough to heat the incoming gases to catalyst operating temperature and, as a consequence, heat from some external source must be supplied. This in turn also increases both operating costs and capital requirements for the sulfuric acid facility.

One way of enhancing the sulfur dioxide strength of gaseous effluents is by selectively absorbing the sulfur dioxide in a suitable solvent and subsequently stripping the absorbed sulfur dioxide to produce regenerated solvent and a gas enriched in sulfur dioxide content. A variety of aqueous and organic solvents have been used in sulfur dioxide absorption/desorption processes. For example, aqueous solutions of alkali metals (e.g., sodium sulfite/bisulfite solution), amines (e.g., alkanolamines, tetrahydroxyethylalkylenediamines, etc.) and amine salts have been used as regenerable sulfur dioxide absorbents. Organic solvents used in sulfur dioxide absorption/desorption processes include dimethyl aniline and tetraethylene glycol dimethyl ether. However, conventional solvents are hampered by one or more shortcomings with regard to the characteristics desirable in an absorbent used in a sulfur dioxide absorption/desorption cycle.

Many of the solvents currently employed have relatively low sulfur dioxide absorption capacity, especially at the sulfur dioxide partial pressures typically encountered in weak sulfur dioxide-containing effluents (e.g., from about 0.1 to about 5 kPa). Conventional solvents often absorb substantial quantities of water vapor from the sulfur dioxide-containing effluent resulting in a significant reduction in the sulfur dioxide absorption capacity of the solvent. As a result, the molar flow rates of conventional solvents needed to satisfy the desired sulfur dioxide absorption efficiency is increased. Furthermore, the absorption of large quantities of water vapor in the solvent may lead to excessive corrosion of process equipment used in the sulfur dioxide absorption/desorption process. Moreover, some conventional solvents are susceptible to excessive degradation, such as hydrolysis, when the solvent is exposed to high temperatures in acidic environments and/or suffer from high volatility, leading to large solvent losses.

Thus, a need has remained for processes and sulfur dioxide absorption solvents effective for more selective removal and recovery of sulfur dioxide from effluent gases.

SUMMARY OF THE INVENTION

Among the several objects of the present invention, therefore, may be noted the provision of an improved process for selectively removing and recovering sulfur dioxide from a sulfur dioxide-containing source gas; the provision of such a process which can be implemented with relatively low capital and operating costs; the provision of such a process which utilizes a sulfur dioxide absorption solvent exhibiting a relatively low vapor pressure and improved sulfur dioxide absorption capacity, especially at relatively low sulfur dioxide partial pressures; the provision of such a process which utilizes a sulfur dioxide absorption solvent which is substantially immiscible with water and exhibits a reduced tendency to corrode process equipment; and the provision of a process which can be used in association with a contact sulfuric acid plant to produce concentrated sulfuric acid from sulfur dioxide source streams having relatively low sulfur dioxide gas strength and an $H_2O/SO_2$ molar ratio greater than the $H_2O/SO_3$ molar ratio in the product acid stream.

Briefly, therefore, the present invention is directed to a process for selectively removing and recovering sulfur dioxide from a sulfur dioxide-containing source gas. The process comprises contacting a process feed gas stream comprising the source gas with a liquid solvent for selective absorption of sulfur dioxide in a sulfur dioxide absorber. The sulfur dioxide is thereby transferred from the process feed gas stream to the solvent to produce an exhaust gas from which sulfur dioxide has been substantially removed and a sulfur dioxide-rich solvent. In accordance with one embodiment of the present invention, the liquid solvent comprises at least one substantially water immiscible organic phosphonate diester of the formula

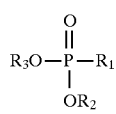

wherein $R^1$, $R^2$ and $R^3$ are independently aryl or $C_1$ to $C_8$ alkyl. The organic phosphonate diester has a vapor pressure less than about 1 Pa at 25° C. and the solubility of water in the organic phosphonate diester is less than about 10 weight percent at 25° C. The absorbed sulfur dioxide is subsequently stripped from the rich solvent in a sulfur dioxide stripper to produce a lean solvent and a sulfur dioxide-enriched stripper gas such that the ratio of the concentration of sulfur dioxide in the stripper gas to the concentration of sulfur dioxide in the source gas is greater than about 1.1. The lean solvent is then recycled to the sulfur dioxide absorber for further selective absorption of sulfur dioxide from the source gas.

In accordance with another embodiment of the present invention, the liquid solvent comprises an organic phosphorous compound selected from phosphate triesters, phosphonate diesters, phosphinate monoesters and mixtures thereof, the substituents bonded to the phosphorous atom and the organic radicals of the ester functionality being independently aryl or $C_1$ to $C_8$ alkyl. The absorbed sulfur dioxide is thereafter stripped from the rich solvent in a sulfur dioxide stripper by contacting the rich solvent with a non-condensable, oxygen-containing stripping gas in the sulfur dioxide stripper to produce the sulfur dioxide-enriched stripper gas and the lean solvent which is recycled to the sulfur dioxide absorber.

The present invention is further directed to a process for producing sulfuric acid from a source gas containing sulfur dioxide. The process comprises contacting a process feed gas stream comprising the source gas with a liquid solvent comprising dibutyl butyl phosphonate for selective absorption of sulfur dioxide in a sulfur dioxide absorber. The sulfur dioxide is thereby transferred from the process feed gas stream to the phosphonate solvent to produce an exhaust gas from which sulfur dioxide has been substantially removed and a sulfur dioxide-rich solvent. Sulfur dioxide is thereafter stripped from the rich solvent in a sulfur dioxide stripper to produce a sulfur dioxide-enriched stripper gas and a lean solvent for recycle to the sulfur dioxide absorber for further selective absorption of sulfur dioxide from the process feed gas. An oxygen-containing converter feed gas stream comprising the stripper gas is introduced into a catalytic converter for oxidation of sulfur dioxide to sulfur trioxide to produce a conversion gas comprising sulfur trioxide. The conversion gas is thereafter contacted with sulfuric acid for absorption of sulfur trioxide therefrom in a sulfur trioxide absorber to produce sulfuric acid and/or oleum and a sulfur trioxide absorber depleted gas stream which exits the sulfur trioxide absorber. The sulfur dioxide-containing source gas fed to the sulfur dioxide absorber comprises the sulfur trioxide absorber depleted gas stream such that sulfur dioxide is recovered from the depleted gas for ultimate conversion to sulfuric acid and/or oleum.

Other objects and features will be in part apparent and in part pointed out hereinafter.

DESCRIPTION OF THE PREFERRED EMBODIMENTS

Figure 1:
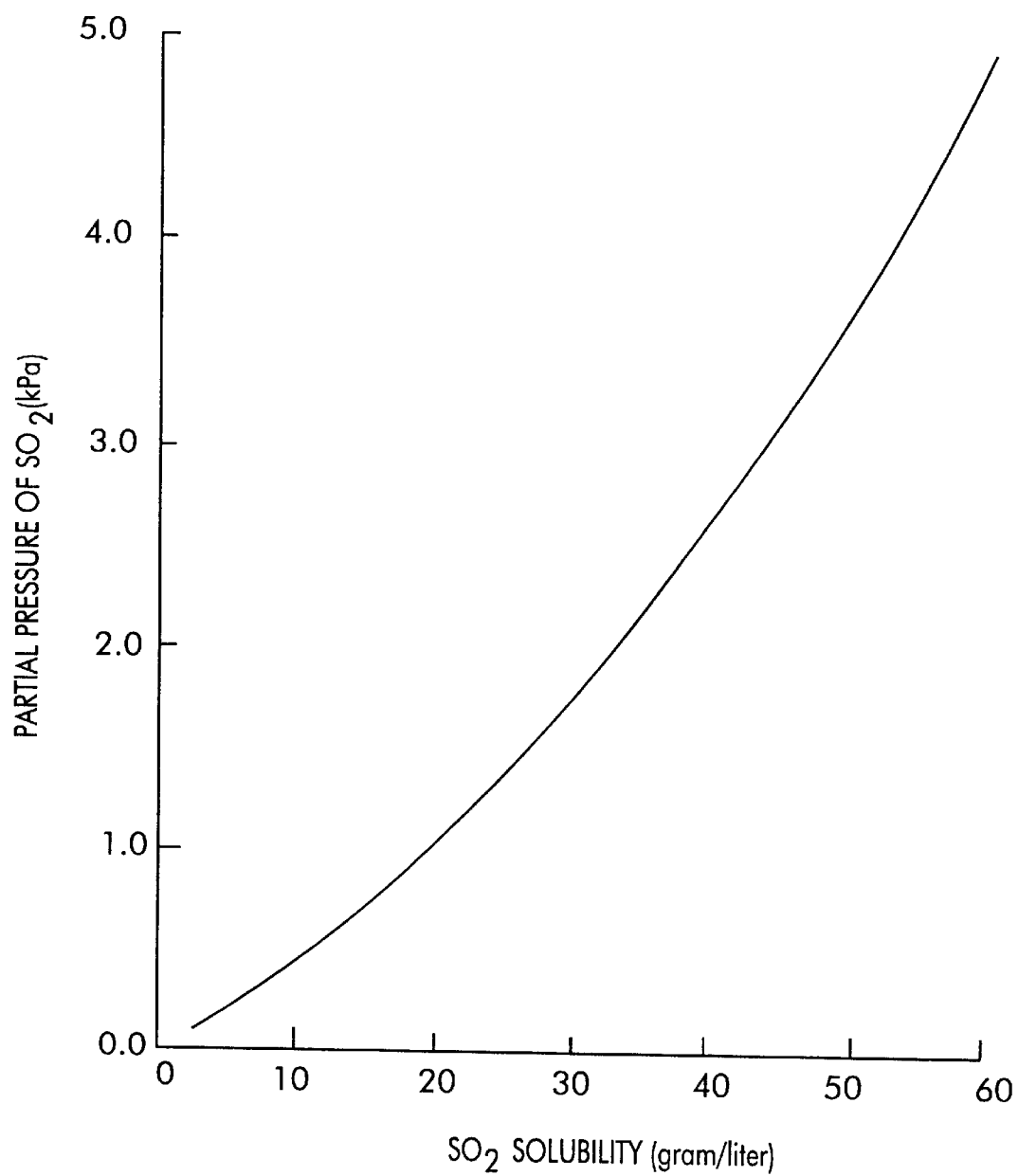
FIGS. 1 and 2 are graphical representations of the absorption of sulfur dioxide by dibutyl butyl phosphonate at 25° and 100° C., respectively, showing grams of sulfur dioxide absorbed per liter of dibutyl butyl phosphonate at varying partial pressures of sulfur dioxide.

In the process of the present invention, a sulfur dioxide-containing source gas is subjected to a sulfur dioxide absorption/desorption cycle to remove and recover sulfur dioxide in the form of a sulfur dioxide-enriched gas (i.e., a gas having an increased sulfur dioxide content relative to the source gas). The sulfur dioxide absorption/desorption process of the present invention is characterized by contacting the sulfur dioxide-containing source gas with a liquid solvent comprising certain organic phosphorous compounds in a sulfur dioxide absorber. The organic phosphorous solvent selectively absorbs sulfur dioxide from the source gas, thereby transferring sulfur dioxide from the source gas to the solvent and producing an exhaust gas from which sulfur dioxide has been substantially removed and a sulfur dioxide-rich solvent. The rich solvent exiting the absorber is stripped of sulfur dioxide in a sulfur dioxide stripper to yield the sulfur dioxide-enriched stripper gas and a lean solvent. Preferably, the rich solvent exiting the absorber is stripped of sulfur dioxide by contacting the rich solvent with a non-condensable, oxygen-containing stripping gas (e.g., air) in the sulfur dioxide stripper. The lean solvent is subsequently recycled to the sulfur dioxide absorber for further selective absorption of sulfur dioxide from the source gas.

In general, the liquid solvent used in the practice of the present invention comprises certain organic phosphorous compounds, more specifically, phosphate triesters, phosphonate diesters, phosphinate monoesters and mixtures thereof. Preferably, the substituents bonded to the phosphorous atom as well as the organic radicals of the ester functionality are independently aryl or $C_1$ to $C_8$ alkyl. Examples of suitable phosphate triesters include: tributyl phosphate, tripentyl phosphate, trihexyl phosphate and triphenyl phosphate. Examples of suitable phosphinate monoesters include: butyl dibutyl phosphinate, pentyl dipentyl phosphinate, hexyl dihexyl phosphinate and phenyl diphenyl phosphinate.

In accordance with a more preferred embodiment of the present invention, the liquid solvent comprises at least one substantially water immiscible organic phosphonate diester of the formula

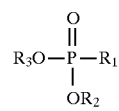

wherein $R^1$, $R^2$ and $R^3$ are independently aryl or $C_1$ to $C_8$ alkyl, $R^1$, $R^2$ and $R^3$ being selected such that the organic phosphonate diester has a vapor pressure less than about 1 Pa at 25° C. and the solubility of water in the organic phosphonate diester is less than about 10 weight percent at 25° C.

A solvent comprising at least one organic phosphonate diester as defined above is more preferred in the practice of the present invention because such a solvent possesses a combination of characteristics which renders it particularly useful in a sulfur dioxide absorption/desorption process, including: increased sulfur dioxide solubility, especially at low partial pressures of sulfur dioxide in the source gas; high heats of solution which reduces the amount of energy required for stripping sulfur dioxide from the rich solvent; low melting points so that the solvent will remain a liquid over a wide range of process temperatures; low viscosity which allows the size of both thermal and absorption/stripping equipment to be reduced; low vapor pressure which reduces solvent losses; decreased tendency to react with water and undergo hydrolysis; and being substantially water immiscible (i.e., non-hygroscopic) such that the solubility of water in the solvent is decreased.

The fact that the organic phosphonate diesters are substantially water immiscible is particularly advantageous in the practice of the present invention. This characteristic provides a solvent which does not absorb excessive amounts of water from the sulfur dioxide-containing source gas. The absorption of large amounts of water in the solvent is detrimental since higher water content in the solvent tends to decrease the sulfur dioxide solubility, requires more energy and capital input to evaporate and condense the absorbed water to separate it from the lean solvent and may lead to excessive corrosion of the process equipment.

Figure 2:
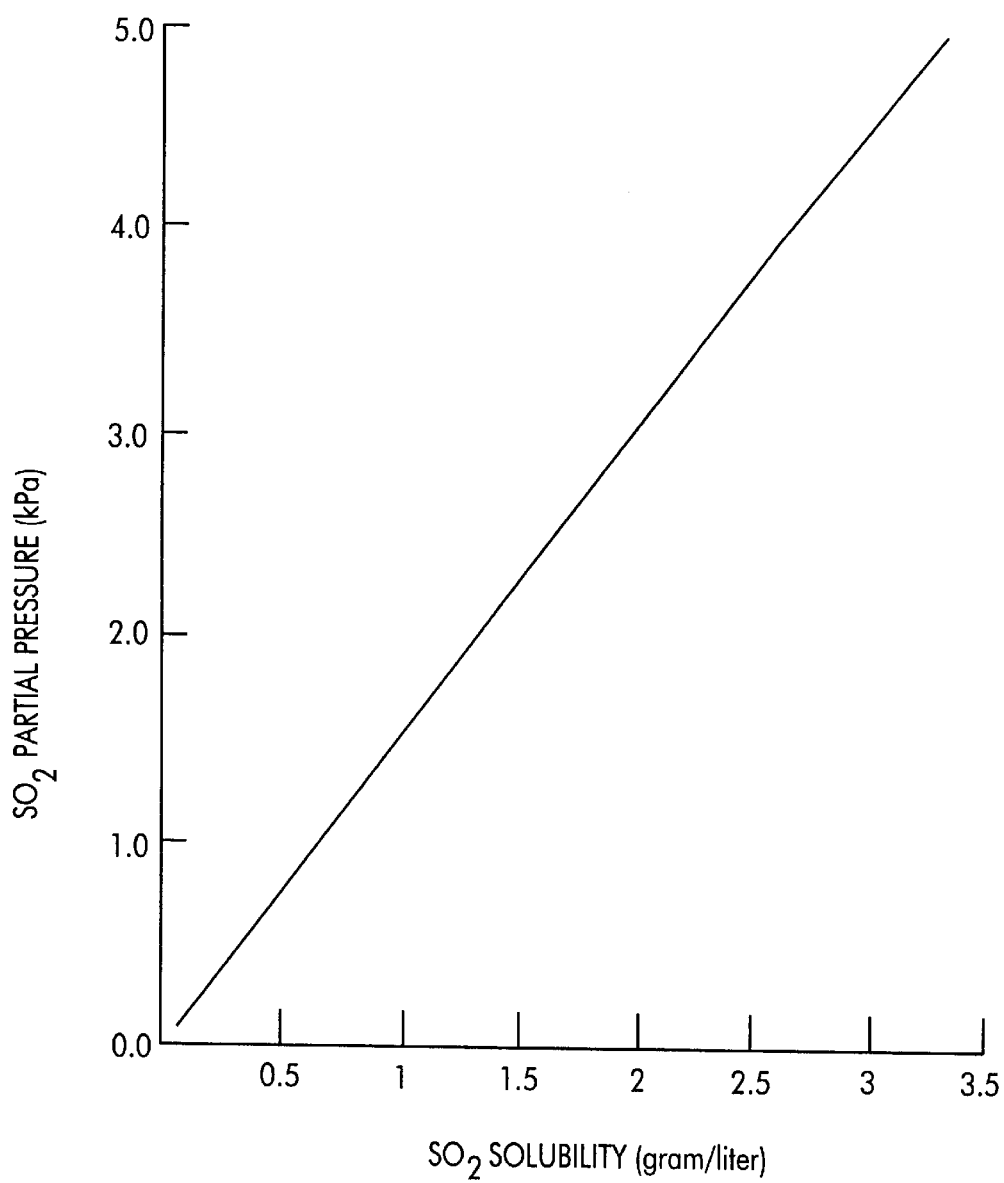

Examples of suitable organic phosphonate diesters for use in the practice of the present invention include dibutyl butyl phosphonate, dipentyl pentyl phosphonate, dihexyl hexyl phosphonate and diphenyl phenyl phosphonate. Preferably, the organic phosphonate is a dialkyl alkyl phosphonate and $R^1$, $R^2$ and $R^3$ are independently $C_1$ to $C_6$ alkyl. More preferably, in order to simplify preparation and reduce the manufacturing costs of the phosphonate solvent, $R^1$, $R^2$ and $R^3$ are identical and each contain more than three carbon atoms. In accordance with an especially preferred embodiment of the present invention, the liquid solvent comprises dibutyl butyl phosphonate. Dibutyl butyl phosphonate is a neutral diester of phosphonic acid and is clear, colorless liquid with a relatively low viscosity and very mild odor. Dibutyl butyl phosphonate has a molecular weight of 250.3 and a vapor pressure of about 0.1 Pa at 25° C. The solubility of water in dibutyl butyl phosphonate is about 5.5 weight percent at 25° C. FIGS. 1 and 2 are graphical representations of the absorption of sulfur dioxide by dibutyl butyl phosphonate at 25° and 100° C., respectively, showing grams of sulfur dioxide absorbed per liter of dibutyl butyl phosphonate at varying partial pressures of sulfur dioxide.

Figure 3:
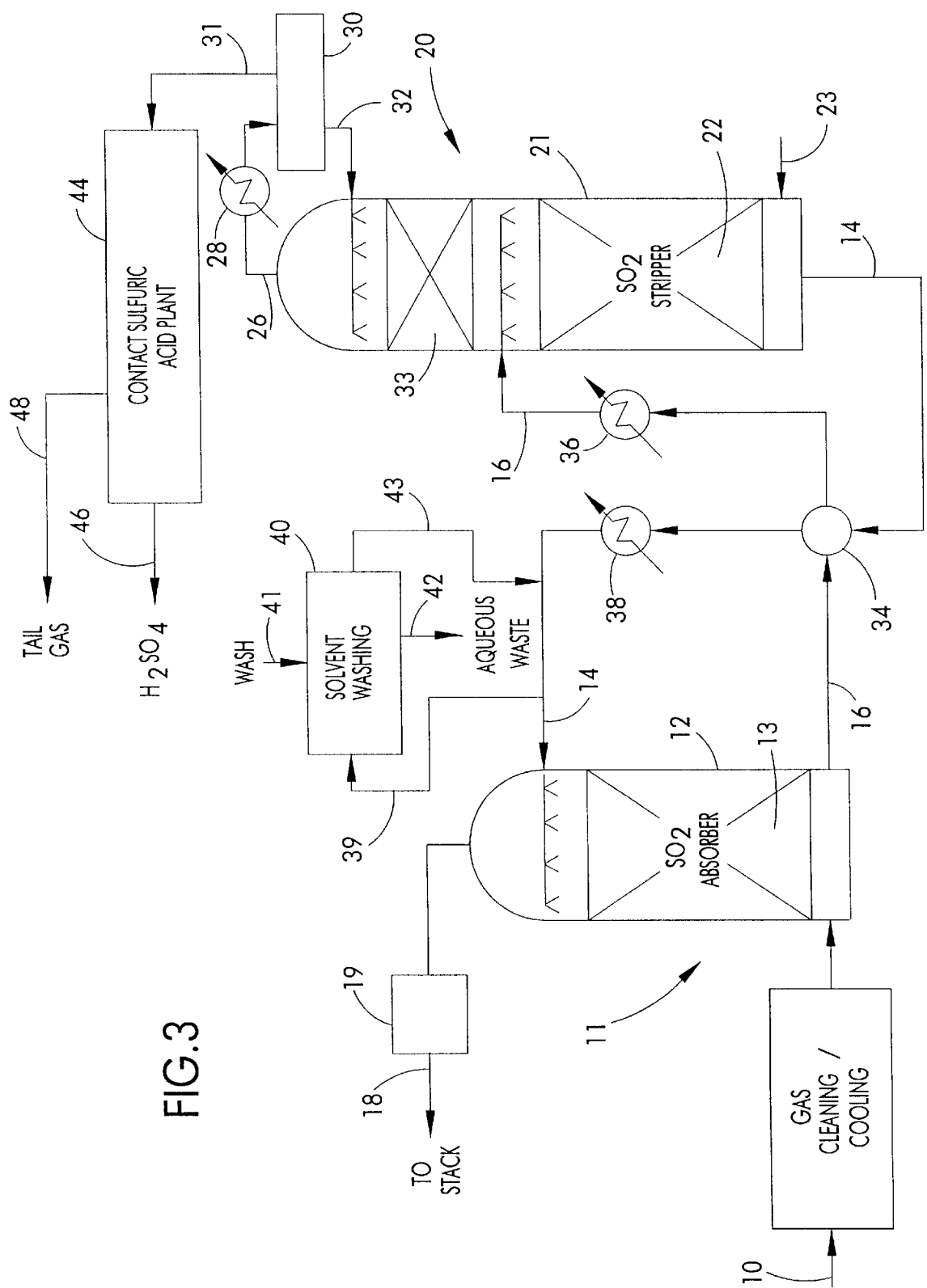
FIG. 3 is a schematic flow sheet illustrating one embodiment of the process of the invention.

FIG. 3 is a schematic flow sheet illustrating one embodiment of the process of the present invention for selectively removing and recovering sulfur dioxide from a sulfur dioxide-containing source gas.

A process feed gas stream 10 comprising the sulfur dioxide-containing source gas is introduced into a sulfur dioxide absorber 11 where it is contacted with an organic phosphorous solvent as described above. The sulfur dioxide-containing source gas may be derived from a variety of sources including the flue gas generated in the combustion of sulfurous fuels, gaseous effluents from metal roasting operations, the incinerator of a Claus plant or the sulfur trioxide absorber of a contact sulfuric acid plant. In addition to sulfur dioxide, the source gas typically contains carbon dioxide, water vapor, oxygen, nitrogen and other inerts. As noted previously, the present invention is particularly suited for the recovery of sulfur dioxide from effluents relatively weak in sulfur dioxide content. Thus, in accordance with a preferred embodiment of the present invention, the source gas contains from about 0.1 to about 5 volume percent sulfur dioxide.

Typically, the source gas is at an elevated temperature and may contain entrained particulate impurities. In such instances, as shown in FIG. 3, the process feed gas stream may be conditioned prior to being introduced into absorber 11 by cleaning the gas to remove particulates and cooling the gas to maintain the desired temperature in the absorber. Depending upon the temperature and composition of the sulfur dioxide-containing source gas, process feed gas stream 10 may be suitably conditioned by a variety of conventional practices well-known to those skilled in the art. For example, the process feed gas stream may first be passed through a waste heat boiler where the gas is cooled by generation of high pressure steam before being passed sequentially through a humidifying tower and one or more indirect heat exchangers, where the gas is further cooled, e.g., with cooling tower water, and an electrostatic precipitator where remaining particulates are removed from the cooled gas. Alternatively, the process feed gas stream may be conditioned by passing the gas through one or more reverse jet scrubbers of the type sold by Monsanto Enviro-Chem Systems, Inc., Saint Louis, Mo. 63178-4547 under the trademark "DYNAWAVE". After conditioning, process feed gas stream 10 introduced into absorber 11 is typically saturated with water vapor at a temperature from about 100 to about 50° C. However, it should be understood that in the practice of the present invention, the process feed gas stream 10 introduced into absorber 11 may be substantially anhydrous, for example, when the source gas is the effluent from the sulfur trioxide absorber of a contact sulfuric acid plant.

Sulfur dioxide absorber 11 comprises a vertical tower 12 containing means for promoting mass transfer between the gas and liquid phases which may comprise a bed of random packings 13 such as saddles or rings. Preferably, in order to maximize transfer of sulfur dioxide, the process feed gas stream 10 is contacted countercurrently with the lean solvent in absorber 11. As shown in FIG. 3, process feed gas stream 10 is introduced through an inlet near the bottom of tower 12 and a lean liquid solvent stream 14 is introduced through a liquid inlet near the top of the tower and distributed over packing 13. A sulfur dioxide-rich solvent stream 16 is withdrawn from a liquid outlet near the bottom of tower 12 and an exhaust gas stream 18 substantially free of sulfur dioxide is removed from an outlet near the top of the tower. Although a conventional, randomly packed tower may be employed as absorber 11, those skilled in the art will appreciate that other configurations may be suitably employed. For example, tower 12 may contain structured packing or comprise a tray tower, in either of which the process streams preferably flow countercurrently.

Condensation of water vapor from the sulfur dioxide-containing source gas in absorber 11 may lead to formation of a separate water phase, which could increase the corrosion rate of metallic process equipment and complicate later removal of the absorbed sulfur dioxide in the subsequent solvent regeneration step. Thus, in order to avoid condensation of water vapor, the temperature of the organic phosphorous solvent introduced into the absorber is preferably above the dew point temperature of process feed gas stream 10.

The mass flow rate ratio (L/G) of lean solvent stream 14 and process feed gas stream 10 necessary to achieve substantial transfer of sulfur dioxide from the source gas to the organic phosphorous solvent in absorber 11 may be determined by conventional design practice. Preferably, the sulfur dioxide absorber is designed and operated such that the sulfur dioxide content of exhaust gas stream 18 exiting the absorber is less than about 500 ppmv, more preferably less than about 200 ppmv. This trace amount of sulfur dioxide along with carbon dioxide, oxygen, nitrogen and other inerts and most of the water vapor contained in the process feed gas stream are eliminated from the system as part of the exhaust gas stream vented from the top of the absorber. If necessary to achieve satisfactory emission standards, exhaust gas stream 18 may be passed through a mist eliminator 19 for recovery of entrained liquid before being discharged through a stack.

The sulfur dioxide-rich solvent is transferred to a sulfur dioxide stripper 20 where sulfur dioxide is stripped from the rich solvent, producing lean solvent and a sulfur dioxide-enriched stripper gas having enhanced sulfur dioxide concentration relative to the source gas fed to the absorber.

Use of the highly efficient organic phosphorous solvents disclosed herein allows the concentration of sulfur dioxide in the sulfur dioxide-enriched gas exiting the stripper to be significantly higher than the concentration of sulfur dioxide in the source gas fed to the system. For example, for source gases containing from about 0.1 to about 5 percent by volume sulfur dioxide, the process of the present invention may be operated such that the ratio of the concentration of sulfur dioxide in the gas exiting the stripper to the concentration of sulfur dioxide in the source gas is greater than about 1.1, at least about 2, at least about 5, at least about 10 or even higher depending upon the sulfur dioxide concentration of the source gas and the desired sulfur dioxide concentration in the enriched stripper gas. When the enriched stripper gas is fed to a contact sulfuric acid plant, the ratio of the concentration of sulfur dioxide in the stripper gas to the concentration of sulfur dioxide in the source gas is preferably at least about 2.

Various methods for stripping absorbed sulfur dioxide from the rich solvent may be employed. In the embodiment illustrated in FIG. 3, sulfur dioxide is stripped by contacting the rich solvent with a non-condensable, oxygen-containing stripping gas in stripper 20 such that sulfur dioxide is transferred from the rich solvent to the stripping gas to produce the sulfur dioxide-enriched stripper gas and regenerated lean solvent. Preferably, the non-condensable, oxygen-containing stripping gas introduced into stripper 20 comprises air. In fact, one of the advantages provided by the solvents comprising organic phosphorous compounds used in the present invention, especially solvents comprising phosphonate diesters, is their inherent flame retarding capability and resistance to oxidation. Thus, unlike some organic solvents used in conventional sulfur dioxide absorption/desorption cycles (e.g., tetraethylene glycol dimethyl ether), the organic solvents utilized in the present invention can be readily stripped of sulfur dioxide using an oxygen-containing stripping gas such as air with minimal risk of solvent degradation or explosion.

Stripper 20 comprises a vertical tower 21 containing means for promoting mass transfer between the gas and liquid phases. Like absorber 11, stripper 20 is shown in FIG. 3 as configured in the form of a packed tower containing a bed of conventional random packing 22. Preferably, in order to maximize transfer of sulfur dioxide, the rich solvent is contacted countercurrently with the stripping gas in stripper 20. Thus, as shown in FIG. 3, a non-condensable, oxygen-containing stripping gas stream 23 is introduced through an inlet near the bottom of tower 21 and rich solvent stream 16 is introduced through a liquid inlet above the bed of packing 22 and distributed over the packing material. Lean solvent stream 14 is withdrawn from a liquid outlet near the bottom of tower 21 and a sulfur dioxide-enriched stripper gas stream 26 is removed from an outlet near the top of the tower. Lean solvent stream 14 removed from the bottom of stripper 20 is recycled to the liquid inlet near the top of sulfur dioxide absorber 11 and serves as the solvent for further absorption of sulfur dioxide from process feed gas stream 10. Although a conventional packed tower may be employed, those skilled in the art will appreciate that the stripper, like the absorber, may have other suitable configurations, including a tower containing structured packing or a tray tower.

The mass flow rate ratio (L/G) of rich solvent stream 16 and non-condensable, oxygen-containing stripping gas stream 23 necessary to achieve substantial transfer of sulfur dioxide from the rich solvent to the enriched stripper gas stream 26 in stripper 20 may be determined by conventional design practice. Preferably, essentially all (i.e., at least about 90 percent) of the sulfur dioxide contained in the rich solvent, more preferably, at least about 95 percent, is transferred to the stripper gas.

The stripper gas stream 26 exiting the top of stripper 20 is passed to an overhead condenser 28 and a portion of the water vapor contained in the stripper gas is condensed by transfer of heat to cooling water. This condensate and the remainder of the sulfur dioxide-enriched stripper gas are then transferred to liquid/gas phase separator 30. A cooled, sulfur dioxide-enriched stripper gas stream 31 exits separator 30 and a liquid stream 32 comprising the condensate is refluxed and introduced into the upper section of stripper 20 over a second bed of packing material 33. Solvent that may have been vaporized in the stripper may also be condensed in the overhead condenser and form part of the condensate refluxed to the stripper. However, in order to avoid formation of two liquid phases in separator 30, it is preferred to operate condenser 28 such that the condensate refluxed to stripper 20 consists essentially of water vapor condensed from the stripper gas.

Although in the embodiment illustrated in FIG. 3, the rich solvent is contacted with a non-condensable, oxygen-containing stripping gas in stripper 20 to recover sulfur dioxide absorbed in the rich solvent, other stripper configurations may be used. For example, steam distillation, i.e., contacting the rich solvent with live steam introduced into the bottom of the stripping column, may be employed in lieu of the non-condensable, oxygen-containing stripping gas. Regardless of how the sulfur dioxide stripping/solvent regeneration step is conducted, the sulfur dioxide is preferably stripped from the rich solvent under non-reducing conditions. Furthermore, the energy requirements of the sulfur dioxide absorption/desorption process of the present invention are modest.

In order to enhance absorption of sulfur dioxide in the solvent, absorber 11 is preferably operated at an average temperature of from about 10° to about 50° C., more preferably from about 30° to about 40° C. In order to promote desorption of sulfur dioxide and avoid thermal degradation of the solvent, stripper 20 is preferably operated at an average temperature of from about 80° to about 120° C., more preferably from about 90° to about 110° C. The preferred operating pressure in absorber 11 is from about 50 to about 150 kPa absolute. Pressure increases the amount of sulfur dioxide which the solvent can absorb, but the absorption can be carried out at relatively low pressure thereby reducing equipment costs. When air stripping is employed, the preferred operating pressure in stripper 20 is from about 20 to about 150 kPa absolute.

Temperature control within absorber 11 and stripper 20 may be achieved by controlling the temperature of various process streams fed to these apparatus. Preferably, the temperature in stripper 20 is maintained within the desired range by controlling only the temperature of rich solvent stream 16 while air is introduced at ambient temperature as the non-condensable, oxygen-containing stripping gas. Again referring to FIG. 3, the sulfur dioxide-rich solvent stream 16 exiting absorber 11 at a temperature from about 10° to about 50° C. is passed through a solvent heat interchanger 34 where it is preheated by indirect transfer of heat from lean solvent stream 14 being recycled from stripper 20 to the sulfur dioxide absorber. If further heating is required in order to achieve the desired temperature in the stripper, preheated rich solvent leaving interchanger 34 may be passed through a solvent heater 36, and further heated by indirect heat exchange with steam. Lean solvent stream 14 exiting stripper 20 at a temperature from about 80° to about 120° C. is cooled in interchanger 34 by transfer of heat to the rich solvent stream 16 exiting sulfur dioxide absorber 11. If further cooling is required in order to maintain the desired temperature in the absorber, lean solvent leaving interchanger 34 may be passed through solvent cooler 38 and further cooled by indirect heat exchange with cooling tower water. Use of solvent interchanger 34 reduces the energy demands of solvent heater 36 and reduces the cooling water required in solvent cooler 38.

During the course of commercial operation, inorganic salts and strong acids may accumulate in the solvent circulated between absorber 11 and stripper 20. When this occurs, a purge stream 39, as illustrated in FIG. 3, may be periodically or continuously removed from lean solvent stream 14 between the stripper and the absorber and directed to a solvent purification vessel 40. An aqueous wash stream 41, such as water or a mildly alkaline aqueous solution (e.g., sodium bicarbonate solution) is also introduced into the purification vessel and contacted with the purge stream. The resulting two-phase mixture may then be decanted to separate the aqueous phase containing the inorganic salt contaminants from the organic phase comprising regenerated lean solvent having a reduced contaminant concentration. A waste stream 42 comprising the aqueous waste is discharged from the purification vessel, while a liquid stream 43 comprising the purified organic phase is returned to lean solvent stream 14 entering absorber 11. The quantity of lean solvent treated in this fashion should be sufficient to maintain the contaminant concentration in the circulating solvent at a level low enough to provide low process equipment corrosion rates and not materially compromise sulfur dioxide absorption efficiency. It should be understood that the washing of the lean solvent may be carried out in a batch or continuous fashion. If lean solvent is washed continuously, a suitable liquid-liquid phase separator such as a centrifugal contactor may be used to separate the aqueous waste and purified organic phases.

The cooled, sulfur dioxide-enriched stripper gas stream 31 exiting separator 30 may be used to prepare elemental sulfur by the Claus process or further cooled to condense sulfur dioxide in the form of a liquid product. For example, the sulfur dioxide-containing source gas may comprise the gaseous effluent from the incinerator of a Claus plant and the sulfur dioxide-enriched stripper gas stream 31 may be recycled to the inlet of the Claus incinerator.

Alternatively, as shown in the embodiment illustrated in FIG. 3, the stripper gas may be fed to a contact sulfuric acid plant 44 such that the sulfur dioxide contained in the stripper gas is ultimately recovered as concentrated sulfuric acid and/or oleum. The process of the present invention is particularly useful in altering the composition of a source gas relatively weak in sulfur dioxide (e.g., about 0.1 to about 5 percent by volume) and having an $H_2O/SO_2$ molar ratio greater than the molar ratio of $H_2O/SO_3$ in the desired acid product so as to provide a sulfur dioxide-enriched gas having a composition suitable for ultimate conversion to concentrated sulfuric acid and/or oleum in a contact sulfuric acid plant.

In plant 44, the stripper gas is introduced into a catalytic converter as part of an oxygen-containing converter feed gas stream. In the converter, the feed gas mixture is passed over a suitable catalyst (e.g., vanadium or cesium-vanadium) for the oxidation of sulfur dioxide to sulfur trioxide, thereby producing a conversion gas comprising sulfur trioxide. The conversion gas is then contacted with sulfuric acid in a sulfur trioxide absorber to absorb sulfur trioxide from the conversion gas and produce a product stream 46 comprising concentrated sulfuric acid and/or oleum and a tail gas stream 48 comprising sulfur trioxide absorber depleted gas.

The sulfur dioxide strength of the stripper gas stream 31 exiting separator 30 is preferably sufficient to provide a gas strength of at least about 8 percent by volume in the converter feed gas stream produced by mixing the stripper gas with air or other oxygen-containing gas. Where the sulfur dioxide content of the converter feed gas is 8 percent by volume or higher, the ratio of inerts to sulfur dioxide is low enough that transfer of heat from the conversion gas to the converter feed gas is sufficient, without need for any extraneous heat source, to bring the converter feed gas to a temperature high enough to initiate a self-sustaining conversion reaction in the catalytic converter.

Advantageously, when air stripping of the rich solvent is employed, the air used for stripping may provide all or part of the oxygen required in the converter feed gas. If all the oxygen is supplied by the air used to strip the rich solvent, the sulfur dioxide-enriched stripper gas should have a sulfur dioxide gas strength of at least about 8 percent by volume, preferably about 10 to about 15 percent by volume. If the stripper gas is mixed with additional air or oxygen in preparing the converter feed gas, a proportionately higher sulfur dioxide gas strength is required in the stripper gas. For example, a sulfur dioxide-enriched stripper gas having a gas strength of 20 to 95 percent by volume may be mixed with air to produce a converter feed gas containing the desired concentration of sulfur dioxide. Regardless of the strength of the process feed gas stream 10 entering absorber 11, a sulfur dioxide-enriched stripper gas may be produced having a substantial sulfur dioxide content, more than adequate to provide for autothermal operation of the contact acid unit and control of acid unit water balance.

At whatever point it is supplied, air or oxygen is mixed with the sulfur dioxide stripped from the rich solvent to provide a converter feed gas containing at least about 0.7 moles of oxygen, preferably about 0.9 to about 1.2 moles oxygen, per mole of sulfur dioxide. The converter feed gas comprising the stripper gas may be dried by contacting the gas with concentrated sulfuric acid in a drying tower prior to introducing the gas into the converter. Alternatively, when air is used to strip sulfur dioxide from the rich solvent, the converter feed gas comprising the resulting stripper gas does need to be dried prior to being introduced into the converter.

In order to control sulfur dioxide emissions, high capacity sulfuric acid plants are commonly operated using the dual absorption process. Sulfur dioxide is converted to sulfur trioxide in a catalytic converter containing a plurality of catalyst beds, each containing a vanadium or cesium-vanadium catalyst. Typically, the converter contains four beds. In a double absorption plant, the partially converted gas stream leaving the second or third bed is passed through an intermediate absorber (i.e, interpass absorber) for removal of sulfur trioxide in the form of product acid. Gas exiting the intermediate absorber is returned to the next bed of the converter. Since the conversion of sulfur dioxide to sulfur trioxide is an equilibrium reaction, removal of sulfur trioxide in the interpass absorber helps drive the reaction forward in the last bed or beds of the converter to achieve high conversions and thereby control sulfur dioxide emissions in the stack gas exiting the final sulfur trioxide absorber.

Provision of an intermediate absorber contributes substantially to the capital and operating cost of a double absorption plant. But even with double absorption, the catalytic converter must be sized conservatively to assure high conversions and consequently low sulfur dioxide emissions. Emission standards generally require that at least 99.7 percent of the sulfur dioxide entering the converter be recovered in the form of sulfuric acid, i.e., that no more than 0.3 percent of the entering sulfur dioxide exit the system in the sulfur trioxide absorber tail gas.

In accordance with one embodiment of the present invention, process feed gas stream 10 fed to absorber 11 comprises all or part of tail gas stream 48 exiting the sulfur trioxide absorber of the contact sulfuric acid plant. That is, the process of the present invention illustrated in FIG. 3 may be operated such that at least a portion of the depleted gas exiting the sulfur trioxide absorber is recycled as part of the sulfur dioxide-containing source gas introduced into absorber 11. Unconverted sulfur dioxide in the tail gas exiting the sulfur trioxide absorber is thereby recaptured in the rich solvent exiting absorber 11, stripped from the rich solvent in stripper 20 and returned to the contact sulfuric acid plant as part of the sulfur dioxide-enriched stripper gas for ultimate recovery as product acid. Inerts and excess oxygen contained in the sulfur trioxide conversion gas are recycled in tail gas stream 48 and purged from the process in exhaust gas stream 18 exiting absorber 11. As a consequence of this purge, the entire tail gas stream may be recycled, so that no stack gas is released to the environment at the exit of the sulfur trioxide absorber. That is, by recycling all of tail gas stream 48 to absorber 11, sulfur dioxide emissions from the contact sulfuric acid plant 44 may be essentially eliminated. Thus, while non-condensable gases separated from the process gas in both the sulfur trioxide and sulfur dioxide absorbers must be purged to the atmosphere, emissions are confined to a single source, thereby facilitating both monitoring and control of sulfur dioxide emissions.

By recycling all of tail gas stream 48 to absorber 11, 99.7 percent or more of the sulfur dioxide in process feed gas stream 10 fed to the sulfur dioxide absorber may be recovered as product acid, even where conversion efficiencies in the sulfuric acid plant 44 are relatively low. Thus, recycle of the entire tail gas stream 48 allows the acid plant to be operated with a single absorber, entirely eliminating the interpass absorption step that has become standard throughout much of the sulfuric acid industry as a means of controlling sulfur dioxide emissions. Moreover, even with single rather than dual absorption, the converter may be designed for a conversion efficiency of less than 98 percent, preferably less than 96 percent; for example, by use of only three, or preferably only two, catalyst beds. Operation is feasible even at a conversion efficiency not greater than about 90 percent. Total recycle of the tail gas stream from the sulfur trioxide absorber allows sulfur dioxide in the tail gas to be recovered in the sulfur dioxide absorption circuit and recirculated to the converter. By using the solvents comprising organic phosphorous compounds disclosed herein which provide essentially quantitative removal of sulfur dioxide from the gas entering absorber 11, the converter can be operated at conversions as low as 95 percent or less, while maintaining ultimate recovery of $\geq 99.7$ percent of sulfur dioxide from the source gas in the form of sulfuric acid product.

Advantageously, the process of the invention may be implemented using a single absorption system and/or by using only two or three catalyst beds in the converter, as discussed above. Alternatively, an existing contact acid plant, operating for example using a relatively weak sulfur dioxide source gas, can be retrofitted to operate at higher than design throughput without exceeding emission limits.

Those skilled in the art will further recognize that, depending on the efficiency of the converter, emission standards might be met by recycle of less than all of the depleted gas from the sulfur trioxide to the sulfur dioxide absorber. Depending on this parameter and local prevailing emission standards, target emissions might be met by recycling 90 percent, 75 percent, or even 50 percent of the tail gas stream 48, with some resultant savings in energy costs for gas compression. However, it is ordinarily preferred that substantially all of tail gas stream 48 be recycled from contact sulfuric acid plant 48 to sulfur dioxide absorber 11.

The present invention is illustrated by the following example which is merely for the purpose of illustration and is not to be regarded as limiting the scope of the invention or manner in which it may be practiced.

EXAMPLE

Using a computer model, the performance of a sulfur dioxide absorption/desorption process in accordance with the present invention (See FIG. 3) was assessed. The model was based on the use of a boiler flue gas as the sulfur dioxide-containing source gas, dibutyl butyl phosphonate (DBBP) as the absorption solvent and air-stripping of the rich solvent. The flow rate, temperature and composition of the relevant gas streams are summarized below in Table 1 and the flow rate, temperature and composition of the relevant liquid streams are summarized in Table 2.

In Table 1, G1 designates the incoming flue gas, G2 designates the flue gas stream after gas cooling and cleaning which is introduced into the sulfur dioxide absorber, G3 designates the sulfur dioxide absorber exhaust gas stream, G4 designates the enriched stripper gas stream exiting the sulfur dioxide stripper, G5 designates the cooled, enriched stripper gas stream exiting the stripper phase separator and G6 designates the stripping air stream.

TABLE 1

| Stream Data | Units | G1 | G2 | G3 | G4 | G5 | G6 |
|---|---|---|---|---|---|---|---|
| $SO_2$ | mole % | 0.40 | 0.35 | 0.04 | 2.80 | 9.76 | — |
| $O_2$ | mole % | 6.40 | 5.62 | 6.71 | 4.57 | 16.50 | 20.39 |
| $N_2$ | mole % | 74.20 | 65.14 | 77.83 | 17.31 | 62.43 | 77.19 |
| $CO_2$ | mole % | 9.70 | 8.52 | 10.17 | 0.02 | 0.09 | — |
| $H_2O$ | mole % | 9.30 | 20.38 | 5.24 | 75.28 | 11.22 | 2.41 |
| Flow Rate | $1 \times 10^3$ $Nm^3/hr$ | 60.5 | 68.9 | 57.7 | 8.14 | 2.26 | 1.82 |
| Temp. | °C. | 260 | 60 | 38 | 101 | 47 | 25 |

In Table 2, L1 designates the lean solvent stream introduced into the sulfur dioxide absorber and L2 designates the rich solvent stream introduced into the sulfur dioxide stripper. The temperature of the lean solvent stream exiting the sulfur dioxide stripper was 86° C. The temperature of the rich solvent stream exiting the sulfur dioxide absorber was 39° C.

TABLE 2

| Stream Data | Units | L1 | L2 |
|---|---|---|---|
| $SO_2$ | wt % | 0.02 | 0.25 |
| $H_2O$ | wt % | 3.00 | 3.06 |
| DBBP | wt % | 96.98 | 96.70 |
| Flow Rate | $1 \times 10^3$ kg/hr | 276 | 277 |
| Temp. | °C. | 38 | 107 |

What is claimed is:

1. A process for selectively removing and recovering sulfur dioxide from a sulfur dioxide-containing source gas comprising the steps of:

contacting a process feed gas stream comprising said source gas with a liquid solvent for selective absorption of sulfur dioxide in a sulfur dioxide absorber, thereby transferring sulfur dioxide from said process feed gas stream to said solvent and producing an exhaust gas from which sulfur dioxide has been substantially removed and a sulfur dioxide-rich solvent, said liquid solvent comprising at least one substantially water immiscible organic phosphonate diester of the formula

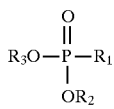

wherein $R^1$, $R^2$ and $R^3$ are independently aryl or $C_1$ to $C_8$ alkyl, said organic phosphonate diester having a vapor pressure less than about 1 Pa at 25° C., the solubility of water in said organic phosphonate diester being less than about 10 weight percent at 25° C.;

stripping sulfur dioxide from said rich solvent in a sulfur dioxide stripper to produce a lean solvent and a sulfur dioxide-enriched stripper gas, the ratio of the concentration of sulfur dioxide in said stripper gas to the concentration of sulfur dioxide in said source gas being greater than about 1.1; and recycling said lean solvent to said sulfur dioxide absorber for further selective absorption of sulfur dioxide from said source gas.

2. A process as set forth in claim 1 wherein said at least one organic phosphonate diester is a dialkyl alkyl phosphonate and $R^1$, $R^2$ and $R^3$ are independently $C_1$ to $C_6$ alkyl.

3. A process as set forth in claim 2 wherein $R^1$, $R^2$ and $R^3$ are identical and each contain more than three carbon atoms.

4. A process as set forth in claim 3 wherein said liquid solvent comprises dibutyl butyl phosphonate.

5. A process as set forth in claim 1 wherein said source gas contains from about 0.1 to about 5 volume percent sulfur dioxide.

6. A process as set forth in claim 5 wherein the ratio of the concentration of sulfur dioxide in said sulfur dioxide-enriched stripper gas to the concentration of sulfur dioxide in said source gas is at least about 5.

7. A process as set forth in claim 6 wherein said sulfur dioxide-enriched stripper gas contains at least about 8 volume percent sulfur dioxide.

8. A process as set forth in claim 5 wherein said sulfur dioxide-containing source gas comprises flue gas from the combustion of a sulfurous fuel or the gaseous effluent from a metal roasting operation, the incinerator of a Claus plant or the sulfur trioxide absorber of a sulfuric acid plant.

9. A process as set forth in claim 1 wherein the temperature in said sulfur dioxide absorber is maintained from about 10° to about 50° C.

10. A process as set forth in claim 9 wherein the process feed gas stream further comprises water, vapor and the temperature of said liquid solvent contacted with said process feed gas stream in said sulfur dioxide absorber is above the dew point of said process feed gas stream.

11. A process as set forth in claim 1 wherein sulfur dioxide is stripped by contacting said rich solvent with a non-condensable, oxygen-containing stripping gas in said sulfur dioxide stripper, sulfur dioxide being transferred from said rich solvent to said stripping gas to produce said sulfur dioxide-enriched stripper gas and said lean solvent.

12. A process as set forth in claim 11 wherein said non-condensable, oxygen-containing stripping gas comprises air.

13. A process as set forth in claim 12 wherein the temperature in said sulfur dioxide stripper is maintained from about 80° to about 120° C.

14. A process as set forth in claim 1 wherein said sulfur dioxide-enriched stripper gas is introduced into a catalytic converter for oxidation of sulfur dioxide to sulfur trioxide as part of an oxygen-containing converter feed gas stream thereby producing a conversion gas comprising sulfur trioxide, said conversion gas being contacted with sulfuric acid in a sulfur trioxide absorber for absorption of sulfur trioxide therefrom to produce sulfuric acid or oleum and a sulfur trioxide absorber depleted gas stream which exits said sulfur trioxide absorber.

15. A process as set forth in claim 14 wherein said sulfur dioxide-containing source gas comprises said sulfur trioxide absorber depleted gas stream such that sulfur dioxide is recovered from said depleted gas for ultimate conversion to sulfuric acid or oleum.

16. A process as set forth in claim 15 wherein sulfur dioxide in said sulfur dioxide-enriched stripper gas is converted to sulfuric acid in a contact sulfuric acid process comprising a single sulfur trioxide absorber.

17. A process as set forth in claim 15 wherein said catalytic converter comprises less than four catalyst beds.

18. A process for producing sulfuric acid from a source gas containing sulfur dioxide comprising the steps of:

contacting a process feed gas stream comprising said source gas with a liquid solvent for selective absorption of sulfur dioxide in a sulfur dioxide absorber, thereby transferring sulfur dioxide from said process feed gas stream to said solvent and producing an exhaust gas from which sulfur dioxide has been substantially removed and a sulfur dioxide-rich solvent, said liquid solvent comprising dibutyl butyl phosphonate;

stripping sulfur dioxide from said rich solvent in a sulfur dioxide stripper to produce a lean solvent and a sulfur dioxide-enriched stripper gas;

recycling said lean solvent to said sulfur dioxide absorber for further selective absorption of sulfur dioxide from said process feed gas;

introducing an oxygen-containing converter feed gas stream comprising said stripper gas into a catalytic converter for oxidation of sulfur dioxide to sulfur trioxide, thereby producing a conversion gas comprising sulfur trioxide; and contacting said conversion gas with sulfuric acid for absorption of sulfur trioxide therefrom in a sulfur trioxide absorber to produce sulfuric acid or oleum and a sulfur trioxide absorber depleted gas stream which exits said sulfur trioxide absorber, said sulfur dioxide-containing source gas comprising said sulfur trioxide absorber depleted gas stream such that sulfur dioxide is recovered from said depleted gas for ultimate conversion to sulfuric acid and/or oleum.

19. A process for selectively removing and recovering sulfur dioxide from a sulfur dioxide-containing source gas comprising the steps of:

contacting a process feed gas stream comprising said source gas with a liquid solvent for selective absorption of sulfur dioxide in a sulfur dioxide absorber, thereby transferring sulfur dioxide from said process feed gas stream to said solvent and producing an exhaust gas from which sulfur dioxide has been substantially removed and a sulfur dioxide-rich solvent, said liquid solvent comprising an organic phosphorous compound selected from phosphate triesters, phosphonate diesters, phosphinate monoesters and mixtures thereof, the substituents bonded to the phosphorous atom and the organic radicals of the ester functionality being independently aryl or $C_1$ to $C_8$ alkyl;

stripping sulfur dioxide from said rich solvent in a sulfur dioxide stripper by contacting said rich solvent with a non-condensable, oxygen-containing stripping gas in said sulfur dioxide stripper, sulfur dioxide being transferred from said rich solvent to said stripping gas to produce a lean solvent and a sulfur dioxide-enriched stripper gas; and recycling said lean solvent to said sulfur dioxide absorber for further selective absorption of sulfur dioxide from said source gas.

20. A process as set forth in claim 19 wherein said non-condensable, oxygen-containing stripping gas comprises air.

21. A process as set forth in claim 1 wherein said sulfur dioxide-enriched stripper gas is fed to a Claus plant for the preparation of elemental sulfur.

22. A process as set forth in claim 21 wherein said Claus plant comprises an incinerator, said sulfur dioxide-containing source gas comprising gaseous effluent from said Claus plant incinerator such that sulfur dioxide is recovered from said Claus plant incinerator effluent for ultimate conversion to elemental sulfur.

23. A process as set forth in claim 1 wherein sulfur dioxide is stripped from said rich solvent under non-reducing conditions.

24. A process as set forth in claim 23 wherein at least about 90% of the sulfur dioxide absorbed in said rich solvent introduced into said stripper is transferred to said sulfur dioxide-enriched stripper gas.

25. A process for selectively removing and recovering sulfur dioxide from a sulfur dioxide-containing source gas comprising the steps of:

contacting a process feed gas stream comprising said source gas and water vapor with a liquid solvent for selective absorption of sulfur dioxide in a sulfur dioxide absorber, thereby transferring sulfur dioxide from said process feed gas stream to said solvent and producing an exhaust gas from which sulfur dioxide has been substantially removed and a sulfur dioxide-rich solvent, the temperature of said liquid solvent contacted with said process feed gas stream in said absorber being above the dew point of said process feed gas stream, said liquid solvent comprising at least one substantially water immiscible organic phosphonate diester of the formula

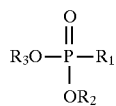

wherein $R^1$, $R^2$ and $R^3$ are independently aryl or $C_1$ to $C_8$ alkyl, said organic phosphonate diester having a vapor pressure less than about 1 Pa at 25° C., the solubility of water in said organic phosphonate diester being less than about 10 weight percent at 25° C.;

stripping sulfur dioxide from said rich solvent in a sulfur dioxide stripper to produce a lean solvent and a sulfur dioxide-enriched stripper gas; and recycling said lean solvent to said sulfur dioxide absorber for further selective absorption of sulfur dioxide from said source gas.

26. A process for selectively removing and recovering sulfur dioxide from a sulfur dioxide-containing source gas comprising the steps of:

contacting a process feed gas stream comprising said source gas with a liquid solvent for selective absorption of sulfur dioxide in a sulfur dioxide absorber, thereby transferring sulfur dioxide from said process feed gas stream to said solvent and producing an exhaust gas from which sulfur dioxide has been substantially removed and a sulfur dioxide-rich solvent, said liquid solvent comprising at least one substantially water immiscible organic phosphonate diester of the formula

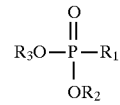

wherein $R^1$, $R^2$ and $R^3$ are independently aryl or $C_1$ to $C_8$ alkyl, said organic phosphonate diester having a vapor pressure less than about 1 Pa at 25° C., the solubility of water in said organic phosphonate diester being less than about 10 weight percent at 25° C.;

stripping sulfur dioxide from said rich solvent in a sulfur dioxide stripper to produce a lean solvent and a sulfur dioxide-enriched stripper gas;

treating said lean solvent to remove contaminants by contacting at least a portion of said lean solvent with an aqueous wash to produce a two-phase liquid mixture comprising an aqueous phase containing contaminants removed from said lean solvent and an organic phase comprising lean solvent having a reduced contaminant concentration and separating said organic phase from said aqueous phase; and recycling said organic phase comprising lean solvent to said sulfur dioxide absorber for further selective absorption of sulfur dioxide from said source gas.

27. A process as set forth in claim 26 wherein said aqueous wash is selected from the group consisting of water and an alkaline aqueous solution.

28. A process as set forth in claim 26 wherein the treatment of said lean solvent to remove contaminants is conducted in a batchwise fashion.

29. A process as set forth in claim 26 wherein the treatment of said lean solvent to remove contaminants is conducted continuously.

30. A process a set forth in claim 29 wherein said organic phase is separated from said aqueous phase using a centrifugal contactor.

* * * * *